(12) United States Patent
Sato et al.

(10) Patent No.: US 10,629,873 B2
(45) Date of Patent: Apr. 21, 2020

(54) BUS BAR MODULE AND BATTERY PACK

(71) Applicant: Yazaki Corporation, Tokyo (JP)

(72) Inventors: Katsunori Sato, Shizuoka (JP); Yutaro Okazaki, Shizuoka (JP); Ryota Kataoka, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 125 days.

(21) Appl. No.: 15/672,626

(22) Filed: Aug. 9, 2017

(65) Prior Publication Data

US 2018/0047958 A1 Feb. 15, 2018

(30) Foreign Application Priority Data

Aug. 12, 2016 (JP) ................................ 2016-158831

(51) Int. Cl.
| | | |
|---|---|---|
| *H01M 2/10* | (2006.01) | |
| *H01M 2/20* | (2006.01) | |
| *H01M 10/42* | (2006.01) | |
| *H02G 5/00* | (2006.01) | |

(52) U.S. Cl.
CPC ......... *H01M 2/1077* (2013.01); *H01M 2/202* (2013.01); *H01M 2/206* (2013.01); *H01M 10/425* (2013.01); *H01M 2220/20* (2013.01); *H02G 5/00* (2013.01)

(58) Field of Classification Search
CPC ................................................ H01M 2/1077
See application file for complete search history.

(56) References Cited

U.S. PATENT DOCUMENTS

| | | | |
|---|---|---|---|
| 2010/0271223 A1 | 10/2010 | Ohkura et al. | |
| 2012/0328920 A1* | 12/2012 | Takase | ................ H01M 2/1077 429/90 |
| 2016/0172651 A1 | 6/2016 | Ichikawa et al. | |

FOREIGN PATENT DOCUMENTS

| | | | | |
|---|---|---|---|---|
| JP | 2010-114025 A | | 5/2010 | |
| JP | 2010114025 A | * | 5/2010 | |
| JP | 2010257775 A | | 11/2010 | |
| JP | 2011-210710 A | | 10/2011 | |
| JP | 2012190678 A | * | 10/2012 | |
| JP | 2015022798 A | * | 2/2015 | .............. H01M 2/20 |

(Continued)

OTHER PUBLICATIONS

TranslationJP2015022798A (Year: 2019).*

(Continued)

*Primary Examiner* — Brian R Ohara
(74) *Attorney, Agent, or Firm* — Sughrue Mion, PLLC (57) ABSTRACT

A bus bar module includes a plurality of bus bars, conductive portions for the respective bus bars, and a flexible flat conductor that includes insulating holding members each holding each of the conductive portions and each of the bus bars. The flexible flat conductor includes conductor connection areas for the respective bus bars in which the bus bar and an electric connecting portion are electrically connected to each other, and a connection area that connects the adjacent conductor connection areas in an arranging direction of the bus bars. Each of the conductor connection areas is formed in a mountain fold shape so as to expand and contract in the arranging direction, and is formed so as to reduce a difference in rigidity between the conductor connection areas.

7 Claims, 5 Drawing Sheets

(56) References Cited

FOREIGN PATENT DOCUMENTS

| | | |
|---|---|---|
| JP | 2015022798 A | 2/2015 |
| JP | 2016115544 A | 6/2016 |

OTHER PUBLICATIONS

JP2010114025translation (Year: 2019).*
JP2012190678translation (Year: 2019).*
Communication dated Oct. 23, 2018 from the Japanese Patent Office in counterpart application No. 2016-158831.

* cited by examiner

FIG.1

BUS BAR MODULE AND BATTERY PACK

CROSS-REFERENCE TO RELATED APPLICATION(S)

The present application claims priority to and incorporates by reference the entire contents of Japanese Patent Application No. 2016-158831 filed in Japan on Aug. 12, 2016.

BACKGROUND OF THE INVENTION

1. Field of the Invention

The present invention relates to a bus bar module and a battery pack.

2. Description of the Related Art

It is conventionally known that electric vehicles and hybrid vehicles have a battery module in which a large number of battery cells are arranged and connected to each other in series or in parallel mounted thereon from the viewpoint of acquiring a high output, a long driving range, and the like. In the battery module, the battery cells are continuously arranged in a state where one-side electrode terminals of the respective battery cells are arranged in a row and the other-side electrode terminals are also arranged in a row. This battery module is accommodated in a casing including accommodating chambers for the respective battery cells, and is formed as a battery pack together with a bus bar module and the like. For example, a bus bar module is provided for each group of electrode terminals arranged in a row, and includes at least a plurality of bus bars that are physically and electrically connect electrode terminals of adjacent battery cells to each other, conductive portions for the respective bus bars that extend in the same direction from each other in the arranging direction of each bus bar and are disposed at intervals from each other, and are each physically and electrically connected to the bus bar to be connected, and insulating holding members each holding each of the conductive portions and each of the bus bars. For example, Japanese Patent Application Laid-open No. 2010-114025 and Japanese Patent Application Laid-open No. 2011-210710 disclose this kind of bus bar module and battery pack.

In bus bar modules, as described in Japanese Patent Application Laid-open No. 2010-114025, there has been known a bus bar module in which respective conductive portions extend in the same direction from each other in an arranging direction of bus bars, and an end part of each of the conductive portions in an extension direction side is physically and electrically connected to the bus bar to be connected. In bus bar modules, as described in Japanese Patent Application Laid-open No. 2011-210710, there has been known a bas bar module in which each of the conductive portions and holding members have flexibility and a part between adjacent bus bars in each of the conductive portions and in each of the holding members is formed in a mountain fold shape and configured to absorb tolerance variations between electrode terminals. However, when the mountain fold shape is applied to the bus bar module in Japanese Patent Application Laid-open No. 2010-114025, as each of the mountain fold-shaped parts is disposed closer to an extending direction side of the conductive portions, the number of the conductive portions is reduced one by one and thus rigidity of the mountain fold-shaped parts is lowered. This bus bar module is therefore assembled on a battery module while expanding and contracting in an arranging direction of bus bars on the basis of each of the mountain fold-shaped parts, but a difference in an amount of expansion and contraction between adjacent bus bars occurs along with a difference in rigidity of each of the mountain fold-shaped parts, and a position of each of the bus bars to the electrode terminals is adjusted in consideration of the difference in the amount of expansion and contraction. Thus, the conventional bus bar module has still room to improve assembling workability of a battery module.

SUMMARY OF THE INVENTION

An object of the present invention is to provide a bus bar module and a battery pack capable of improving assembling workability of a battery module.

In order to achieve the above mentioned object, a bus bar module according to one aspect of the present invention includes a plurality of bus bars that are arranged at intervals from each other in an arranging direction of electrode terminals of each of electrode terminal groups arranged in a row on a battery module formed of a plurality of battery cells, and are physically and electrically connected to the electrode terminals to be connected, and a flexible flat conductor that includes conductive portions each electrically connected to each of the bus bars, and insulating holding members each holding each of the conductive portions and each of the bus bars, and gives flexibility to the conductive portions and the holding members, the flexible flat conductor being formed in a flat shape, wherein the conductive portions include respective extension sections that extend in the same direction from each other in the arranging direction and are disposed at intervals from each other, and respective electric connecting portion that are each an end part on an extending direction side of the extension sections and are each electrically connected to the bus bar in a direct or indirect manner, the holding members each include a cover that covers each of the conductive portions so as to collectively hold the conductive portions, and a bus bar holder for each of the bus bars, the bus bar holder projecting from the cover and individually holding each of the bus bars, the flexible flat conductor includes conductor connection areas for respective bus bars, the conductor connection areas each including the bus bar and the electric connecting portion electrically connected to each other, and a connection area that connects the conductor connection areas adjacent in the arranging direction to each other, and each of the connection areas is formed in a mountain fold shape so as to expand and contract in the arrangement direction, and is formed so as to reduce a difference in rigidity between the connection areas.

According to another aspect of the present invention in the bus bar module, the bus bars and the flexible flat conductor may be individually formed and then assembled to each other, and when the holding members include respective notch areas each continued to the connection area between the bus bar holders adjacent in the arranging direction, each of the notch areas may have a larger notch size when the notch area is continued to the connection area having a larger number of the conductive portions.

According to still another aspect of the present invention, in the bus bar module, when a plurality of notch areas are provided by notching one sheet of conductive plate material with the holding members so as to divide the plate material into the bus bars and form the respective bus bar holders and the respective connection areas, each of the notch areas may have a larger notch size when the notch area is continued to the connection area having a larger number of the conductive portions.

According to still another aspect of the present invention, in the bus bar module, the electrode terminals may be each a pillared electrode pole that projects from a cell main body of the corresponding battery cell, and each of the bus bars may include a through-hole in which the electrode terminal is inserted.

A battery pack according to still another aspect of the present invention includes a battery module that is formed of a plurality of battery cells, and a bus bar module that electrically connects the battery cells to each other in series or in parallel, wherein the bus bar module includes a plurality of bus bars that are arranged at intervals from each other in an arranging direction of electrode terminals of each of electrode terminal groups arranged in a row on the battery module, and are physically and electrically connected to the corresponding electrode terminals and a flexible flat conductor that includes a conductive portion physically and electrically connected to each of the bus bars and insulating holding members each holding each of the conductive portions and each of the bus bars, and gives flexibility to the conductive portions and the holding members, the flexible flat conductor being formed in a flat shape, the conductive portions include respective extension sections that extend in the same direction from each other in the arranging direction and are disposed at intervals from each other, and respective electric connecting portions that are each an end part on an extending direction side of the extension sections and are each physically and electrically connected to the bus bar, the holding members each include a cover that covers each of the conductive portions so as to collectively hold the conductive portions, and a bus bar holder for each of the bus bars, the bus bar holder projecting from the cover and individually holding each of the bus bars, the flexible flat conductor includes conductor connection areas for respective bus bars, the conductor connection areas each including the bus bar and the electric connecting portion connected to each other, and a connection area that connects the conductor connection areas adjacent in the arranging direction to each other, and each of the connection areas is formed in a mountain fold shape so as to expand and contract in the arrangement direction, and is formed so as to reduce a difference in rigidity between the connection areas.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a bus bar module and a battery pack according to the present invention will now be described with reference to the accompanying drawings. It should be noted that the embodiment below is not intended to limit this invention.

Embodiment

One embodiment of a bus bar module and a battery pack according to the present invention will now be described with reference to FIGS. 1 to 5.

Figure 1:
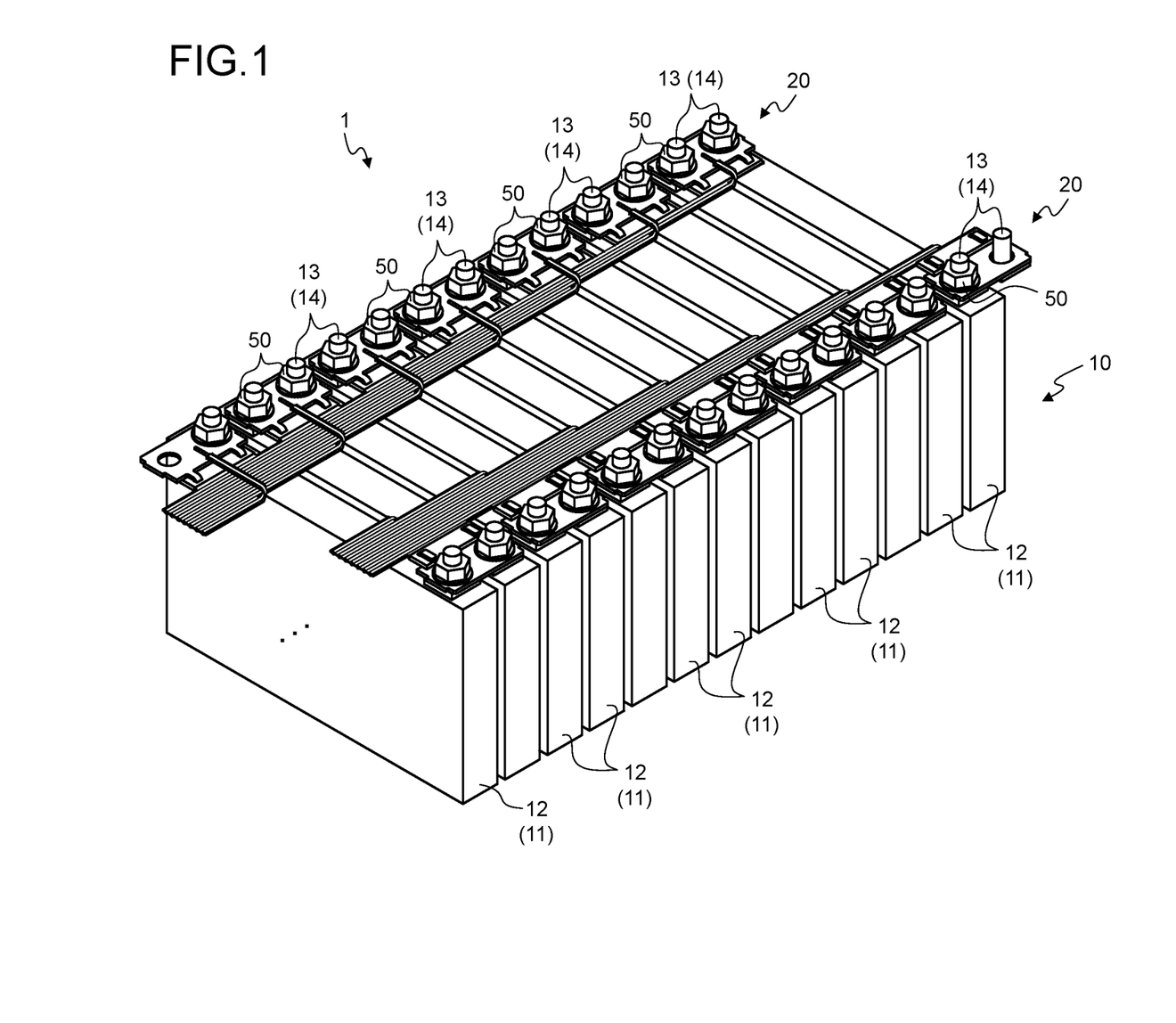
FIG. 1 is a perspective view illustrating a battery pack according to an embodiment.

Numeral 1 in FIG. 1 represents a battery pack. Numeral 10 represents a battery module of the battery pack 1. Numeral 20 represents bus bar modules of the battery pack 1.

Figure 2:
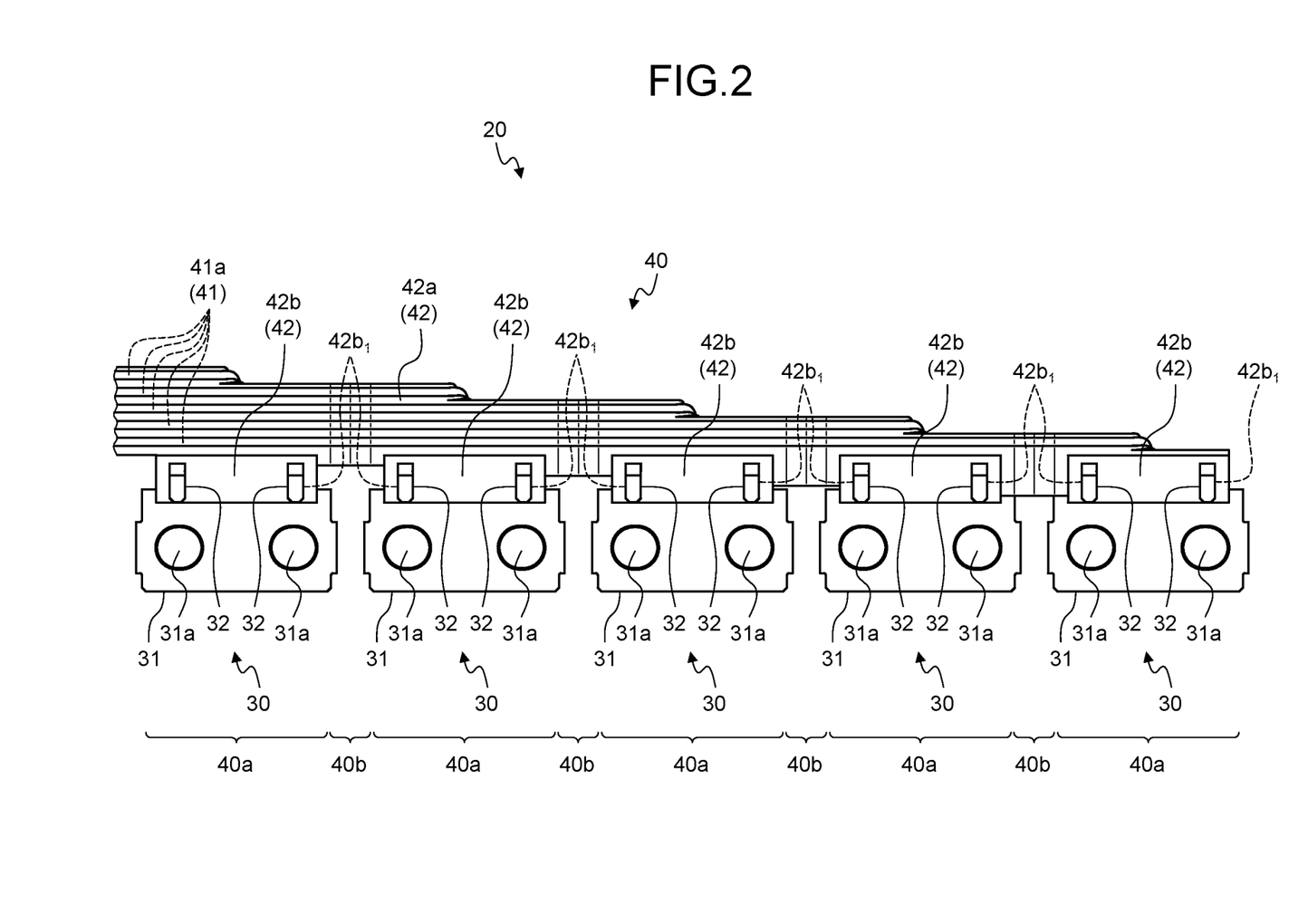
FIG. 2 is a top view illustrating a bus bar module according to the embodiment.
Figure 3:
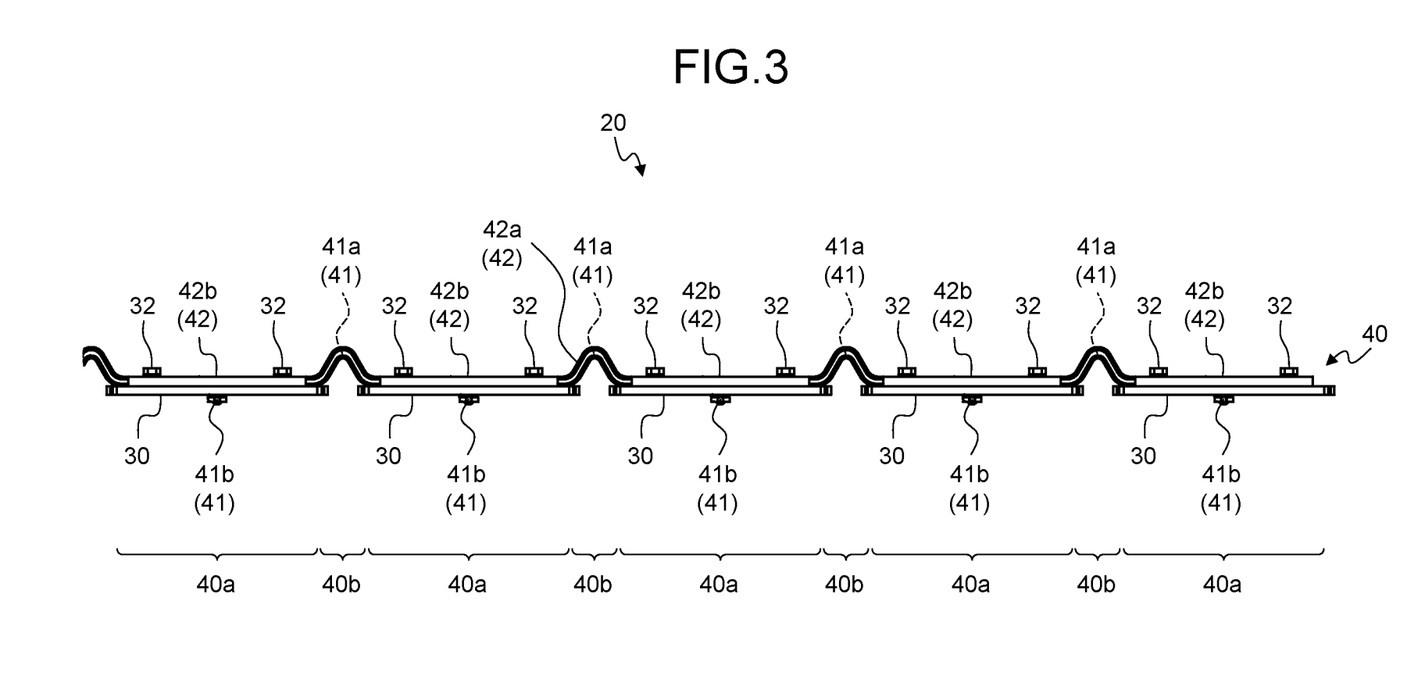
FIG. 3 is a side view illustrating the bus bar module according to the embodiment.
Figure 4:
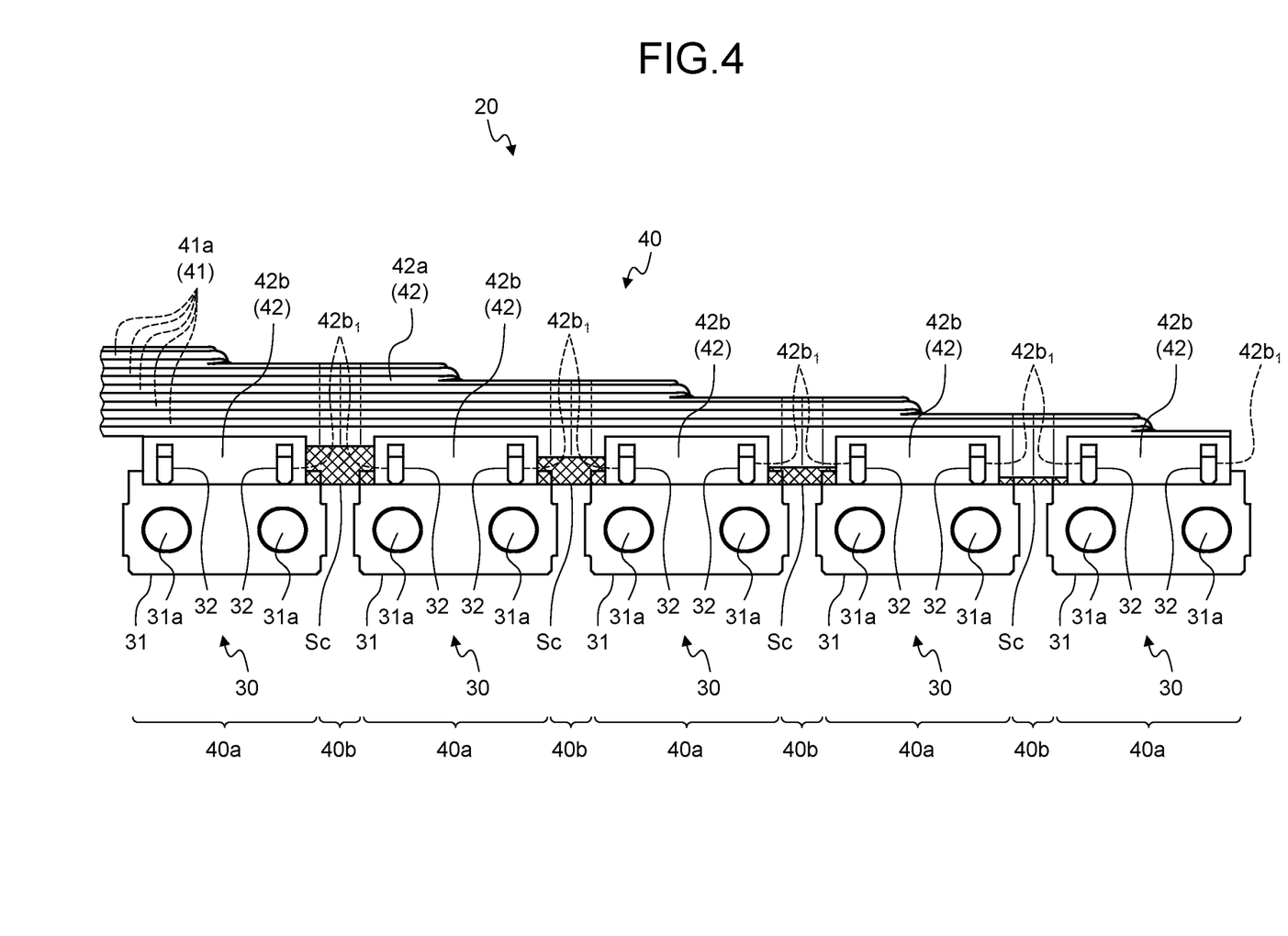
FIG. 4 is an explanatory view illustrating a notch area.

The battery pack 1 is mounted on vehicles such as electric vehicles and hybrid vehicles, and includes the battery module 10 and the bus bar modules 20 arranged on the battery module 10. The battery module 10 is an assembly of a plurality of battery cells 11. The bus bar modules 20 electrically connects the battery cells 11 of the battery module 10 to each other in series or in parallel, and includes a plurality of bus bars 30 and a flexible flat conductor 40 (FIG. 2). In this battery pack 1, the battery module 10 is accommodated in a casing including an accommodating chamber for each battery cell 11. In the embodiment, the casing is not illustrated for convenience.

Each of the battery cells 11 includes two electrode terminals 13 provided at ends of a cell main body 12. For example, in the each of the battery cells 11 in this example, the cell main body 12 is formed in a parallelepiped shape and is provide with the electrode terminals 13 on one face. In this example, the face on which the electrode terminals 13 are provided is directed to an upper part of a vehicle. In the battery cell 11, the electrode terminals 13 as pillared electrode poles are projected at both ends on the face in a longitudinal direction. For example, in the embodiment, two stud bolts are vertically provided on both ends of the cell, and the stud bolts are used as the electrode terminals 13. The electrode terminals 13 extend in a direction orthogonal to the face. One of the electrode terminals 13 is a positive electrode and the other is a negative electrode.

In the battery module 10, the battery cells 11 are continuously arranged while the electrode terminals 13 on one of the both ends of the battery cells 11 are arranged in a row and the electrode terminals 13 on the other end are also arranged in a row. In other words, the battery module 10 is virtually formed in a parallelepiped shape by the battery cells 11, and electrode terminal groups 14 formed of the electrode terminals 13 arranged in a row are provided at two places on one face of the parallelepiped shape. The battery module 10 may have electrode terminal groups 14 in which the positive and negative electrode terminals 13 are alternately arranged, alternatively may have the electrode terminal groups 14 in which the electrode terminals 13 having the same electrode are arranged in a row. The battery module 10 in FIG. 1 represents a part of the arranged battery cells 11.

As described above, each of the bus bar modules 20 includes the bus bars 30 and the flexible flat conductor 40 (FIG. 2). Each bus bar module 20 is formed by integrating the bus bars 30 with the flexible flat conductor 40. At least one bus bar module 20 is provided per each electrode terminal group 14.

Each of the bus bars 30 is formed with a conductive material such as metal, and physically and electrically connects two adjacent electrode terminals 13 in the electrode terminal group 14 (in other words, the electrode terminals 13 of the adjacent battery cells 11) to each other so as to electrically connect the two electrode terminals 13. Thus, in each of the bus bar modules 20, the bus bars 30 are arranged at intervals from each other in an arranging direction of the electrode terminals 13, and each of the bus bars 30 is physically and electrically connected to the electrode terminal 13 to be connected.

Each of the bus bars 30 includes a bus bar main body 31 that physically and electrically connects the electrode terminals 13, and connectors 32 for installing the bus bar main body 31 on the flexible flat conductor 40.

The flexible flat conductor 40 includes conductive portions 41 each being electrically connected to each of the bus bars 30, and insulating holding members 42 each holding each of the conductive portions 41 and each of the bus bars 30 (FIG. 2). Each flexible flat conductor 40 is formed as a flat conductor having flexibility by giving flexibility to and flattening the conductive portions 41 and the holding members 42.

The flexible flat conductor 40 includes the conductive portions 41 having the same number as that of the bus bars 30 to be held. The conductive portions 41 include respective extension sections 41a (FIG. 2) that extend in the same direction from each other in the arranging direction of each of the bus bars 30 and are disposed at an interval from each other, and respective electric connecting portions 41b (FIG. 3) that are each an end part and are each electrically connected to the bus bar 30 to be connected in a direct or indirect manner.

The extension sections 41a (in other words, the conductive portions 41) are arranged at intervals from each other, of the directions orthogonal to an extending direction (in other words, the arranging direction of each of the bus bars 30), in a direction connecting the two electrode terminals 13 in the one battery cell 11. The extension sections 41a are disposed on substantially the same flat surface.

When the conductive portions 41 are directly connected to the bus bars 30, end parts on an extending direction side guided from the extension sections 41a to the bus bars 30 side are the electric connecting portions 41b. When the conductive portions 41 are indirectly connected to the bus bars 30, end parts of the extension sections 41a on the extending direction side are the electric connecting portions 41b, and the electric connecting portions 41b and the bus bars 30 are electrically connected to each other through, for example, a conductive connection tool (not illustrated).

In this flexible flat conductor 40, each of the conductive portions 41 is covered with the holding member 42. The holding member 42 includes a cover 42a that covers each of the conductive portions 41 so as to collectively hold the conductive portion s 41, and a bus bar holder 42b that projects from the cover 42a and individually holds the bus bar 30 for each bus bar 30 (FIG. 2).

Examples of the flexible flat conductor 40 are considered to include a flat cable (so called FC), a flexible flat cable (so called FFC), and printing circuit bodies such as a flexible printed circuit board (so called FPC) and a membrane wiring board. In the specific example described below, a flat cable is taken for example as the flexible flat conductor 40.

The following describes a specific example of each of the bus bar modules 20 according to the embodiment.

The bus bar module 20 in this example is formed by assembling the individually formed bus bars 30 and the flexible flat conductor 40 to each other and integrating the bus bars 30 with the flexible flat conductor 40.

For example, each of the bus bars 30 in this example is formed by applying a press working such as punching and folding to a metal plate (copper plate and the like) that serves as a base material. Each of the bus bars 30 includes the rectangular and flat plate-shaped bus bar main body 31.

Each of the bus bars 30 physically and electrically connects the bus bar main body 31 to the electrode terminals 13. For example, welding (for example, laser welding), screwing, and the like are used for electrically connecting the bus bar main body 31 to the electrode terminals 13. In the embodiment, the electrode terminals 13 also serve as stud bolts. Thus, in the bus bar main body 31, through-holes 31a are formed for inserting the electrode terminals 13 therein. In the bus bar main body 31 in this example, two round through-holes 31a are formed, arranged in a row in the arranging direction of each of the bus bars 30. The through-holes 31a allow the two adjacent electrode terminals 13 in the electrode terminal group 14 to be respectively inserted therethrough. Thus, a design value of a pitch for the through-holes 31a is set to be identical with a design value of a pitch for the two adjacent electrode terminals 13. Furthermore, a size and a shape of each of the through-holes 31a with respect to the electrode terminal 13 are, even though an interval between the two adjacent electrode terminals 13 is maximally deviated from a design value within a tolerance range, set so that the electrode terminals 13 are respectively inserted through the through-hole 31a.

The bus bar module 20 according to the embodiment places the bus bars 30 on the battery module 10 while causing the electrode terminals 13 to be connected to be inserted through the through-holes 31a. In each of the bus bars 30, nuts 50 illustrated in FIG. 1 are tightened onto the threaded electrode terminals 13 so as to physically and electrically connect the bus bar main body 31 to the electrode terminals 13. In this example, a direction along an axis line direction of the electrode terminals 13 (in other words, a direction orthogonal to flat faces of the bus bar main bodies 31 and an axis line direction of the through-holes 31a) is an assembling direction of the bus bar module 20 to the battery module 10.

In the bus bar module 20 according to the embodiment, the flexible flat conductors 40 are arranged in a row to the bus bar main bodies 31 in a direction orthogonal to an axis line direction of the through-holes 31a (in other words, a direction orthogonal to flat surfaces of the bus bar main bodies 31) and in a direction orthogonal to an arranging direction of the two through-holes 31a (in other words, an arranging direction of the bus bars 30 and an arranging direction of each of the electrode terminals 13 in the electrode terminal group 14). In each of the flexible flat conductors 40, the respective extension sections 41a of the conductive portions 41 are arranged at an interval from each other and at an interval to each of the bus bars 30 along with an arranging direction of the bus bars 30 and the flexible flat conductors 40. In this manner, in the bus bar module 20, each of the bus bars 30 and the flexible flat conductors 40 are disposed on substantially the same plane.

Each of the conductive portions 41 in this example is a linear conductor that is formed as a linear cylinder with a conductive material such as metal (for example, copper), and has flexibility sufficient to folding treatment. This conductive portion 41 is used, for example, as a voltage detection line for detecting a voltage of the battery cells 11. Each of the conductive portions 41 is disposed while an axis line direction of the extension sections 41a matches the arranging direction of each of the bus bars 30. Each of the extension sections 41a is caused to extend to a position at which the bus bar 30 to be connected is installed adjacently (in other words, the vicinity of the bus bar 30 to be connected).

The holding member 42 in this example covers each of the conductive portions 41 so as to include the conductive portions 41, and is formed using a material such as a synthetic resin having insulation properties and flexibility. An appearance shape of the holding member 42 is formed in a flat plate shape.

In each of the bus bar modules 20 according to the embodiment, each of the bus bars 30 includes the connector 32, and the holding member 42 of the flexible flat conductor 40 includes the bus bar holder 42b for each bus bar 30. In this bus bar module 20, the connectors 32 and the bus bar holder 42b are each connected to each other so as to integrate each of the bus bars 30 with the flexible flat conductor 40. In this example, the connectors 32 are inserted into through-holes $42b_1$ (FIG. 2) of the bus bar holder 42b and are deformed so as to caulk the bus bar holder 42b with the connectors 32.

Each of the connectors 32 of the bus bar 30 is provided to an end part of the bus bar main body 31 on the flexible flat conductor 40 side. Each of the two connectors 32 is provided to the end part. Each of the connectors 32 is formed as, for example, an L-shaped body formed of two piece parts. In the connector 32, one of the piece parts extends from an end part of the bus bar main body 31 at the flexible flat conductor 40 side along a flat surface of the bus bar main body 31, and the other piece part extends from an end part of the one piece part at an extending direction side along an axis line direction of the through-hole 31a (direction orthogonal to a flat surface of the bus bar main body 31).

Each of the bus bar holders 42b is provided to an end part of the cover 42a on the bus bars 30 side. From the end part of the cover 42a, each of the rectangular and flat plate-shaped bus bar holder 42b projects for each bus bar 30. Each of the bus bar holders 42b is provided with the two through-holes $42b_1$ through which the other piece parts of the connectors 32 are inserted.

In the bus bar 30, the other piece parts of the two connectors 32 are each inserted into the through-holes $42b_1$ of the bus bar holder 42b, and the other piece parts are folded. In this example, the other piece parts are folded so that the bus bar holder 42b is sandwiched between the one piece parts and the other piece parts. In this manner, the two connectors 32 are caulked on and fixed to the bus bar holder 42b, and the bus bar 30 is held by the bus bar holder 42b.

In the bus bar module 20, for example, a blank of each of the flexible flat conductors 40 is formed by extruding and forming the holding member 42 so that each of the arranged conductive portions 41 is included. In the blank, an unnecessary part (a part of a wire material forming the conductive portions 41 and a part of a cover material forming the cover 42a) is cut and removed so that the extension section 41a of each of the conductive portions 41 extends to a position at which the extension section 41a is installed adjacently to the bus bar 30 to be connected, and a resin material connecting a part that is the adjacent bus bar holders 42b is cut into, for example, a rectangular shape and removed so that each of the bus bar holders 42b is formed. In addition, at the time of this processing, by notching and the like a resin material between the electric connecting portion 41b that is an end part of the conductive portion 41 on the extending direction side and the extension section 41a of the adjacent conductive portion 41, the electric connecting portion 41b is cut and removed from the extension section 41a of the adjacent conductive portion 41. Furthermore, at the time of this processing, only a cover at the tip in the electric connecting portion 41b is stripped, and the tip is exposed. In this manner, the flexible flat conductor 40 is formed. In each of the conductive portions 41, the electric connecting portion 41b is folded to a side of the bus bar 30 to be connected, and a stripped tip is physically and electrically connected to the bus bar 30 to be connected by welding, brazing, and the like. Mostly, the bus bar module 20 is formed in this manner.

Each of the flexible flat conductors 40 includes areas 40a (hereinafter, referred to as "conductor connection areas") for the respective bus bars 30, in each of which, the bus bar 30 and the electric connecting portion 41b are electrically connected to each other, and a connection area 40b that connects the conductor connection areas 40a adjacent in the arranging direction of the bus bars 30 to each other (FIG. 2). In the embodiment, a narrow and small part that is formed of the conductive portion 41 and the cover 42a continued in a space between the adjacent bus bars 30 is defined as the connection area 40b, and the bus bar holder 42b and a part formed of the conductive portion 41 and the cover 42a other than the connection area 40b are defined as the conductor connection area 40a.

In the electrode terminal group 14, even when attention is paid to only the two adjacent electrode terminals 13, there is a possibility that the pitch thereof is deviated from a design value within a tolerance range, this deviation is superposed at the respective places, and intervals of the electrode terminals 13 at both ends may be considerably deviated. In order to absorb the deviation along with tolerance variations in intervals of the electrode terminals 13, this bus bar module 20 is formed so that an interval between the conductor connection areas 40a adjacent in the arranging direction of each of the bus bars 30 can be changed. In the embodiment, each of the connection areas 40b is formed in a mountain fold shape (FIGS. 2 and 3) so as to be expandable and contractible in the arranging direction, and the width of each of the connection areas 40b in the arranging direction is adjusted so as to change an interval between the adjacent conductor connection areas 40a. The mountain fold shape includes at least one mountain fold-shaped projecting part, or may include a plurality of mountain fold-shaped projecting parts (for example, a bellow-shaped parts) by alternately arranging mountains and valleys in the arranging direction of each of the bus bars 30. Forming the connection areas 40b into a mountain fold shape may be executed, for example, before or after connecting the bus bars 30 and the electric connecting portions 41b to each other.

However, the bus bar modules 20 according to the embodiment is formed as described above, and the number of the conductive portions 41 is reduced one by one if the connection areas 40b are disposed closer to the extending direction side of the conductive portions 41. Thus, in each of the connection areas 40b, if the connection area 40b is disposed closer to the extending direction side of the conductive portions 41, rigidity is lowered. A difference in rigidity of the connection areas 40b leads to a difference in amount of expansion and contraction of the connection areas 40b. Considering the difference in amount of expansion and contraction, a user needs to adjust a position of each of the bus bars 30 to the electrode terminals 13.

In the bus bar module 20 according to the embodiment, each of the connection areas 40b is formed so as to reduce a difference in rigidity between the connection areas 40b. For example, as described above, in the flexible flat conductor 40, a resin material connecting a part that is the adjacent bus bar holders 42b is cut and removed in a rectangular shape to form an individual bus bar holder 42b. In other words, in the holding member 42, a notch area Sc continued to the connection area 40b is provided (FIG. 4) between the adjacent bus bar holders 42b in the arranging direction of each of the bus bars 30. Thus, in the bus bar module 20 according to the embodiment, a size of each of the rectangular-shaped notch areas Sc is changed depending on the rigidity of each of the connection areas 40b. When each of the notch areas Sc is continued to the connection area 40b that includes the larger number of the conductive portions 41, a size of a notch thereof is made larger. It is preferable that the rigidity of the connection areas 40b be identical with each other. If this is difficult, a difference in rigidity between the connection areas 40b may be reduced as much as possible. In consideration of this respect, a size of each of the notch areas Sc may be determined.

In this manner, the bus bar module 20 according to the embodiment changes a size of each of the notch areas Sc so as to reduce a difference in rigidity of the connection areas 40b and reduce a difference in an amount of expansion and contraction of the notch areas Sc. In this manner, at the time of changing an interval between the adjacent conductor connection areas 40a, the bus bar module 20 can reduce a difference in change of an interval at each place so as to more facilitate position adjustment of each of the bus bars 30 to the electrode terminals 13 than before. Thus, this bus bar module 20 can improve assembling workability at the time of assembling the bus bar module 20 to the battery module 10.

In the conventional bus bar module, the connection area 40b that includes a smaller number of the conductive portions 41 has lower intensity and is subjected to loads caused by external input, tare weight, and the like. However, in this bus bar module 20, the respective rigidity of the connection areas 40b are close to each other, and a difference in intensity level of the connection areas 40b is reduced. For example, if each of the notch areas Sc is notched to the maximum size in the conventional bus bar module, this bus bar module 20 more enhances the intensity of the connection area 40b that includes the smaller number of the conductive portions 41 than before so as to improve durability to the conventional bus bar module.

As described above, the battery pack 1 according to the embodiment includes the bus bar module 20. Thus, the battery pack 1 can obtain the same effect as that of the bus bar module 20.

Figure 5:
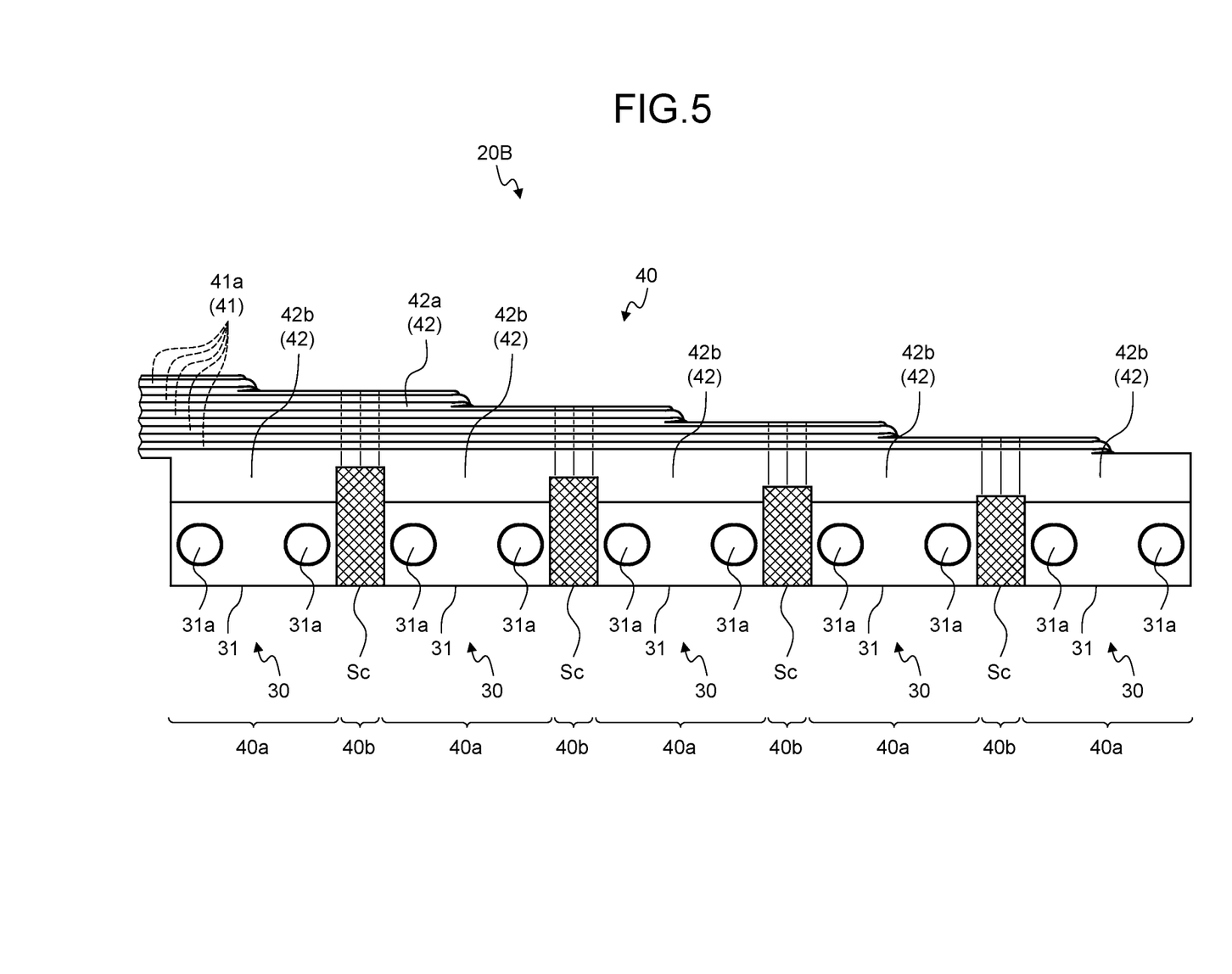
FIG. 5 is a top view illustrating a modification of the bus bar module according to the embodiment.

The bus bar module 20 may be formed by arranging one sheet of conductive and rectangular plate material with each of the conductive portions 41 in a row, extruding and forming the holding member 42 with each of the conductive portions 41 so that one end part of the plate material in a longitudinal direction (end part on a side where each of the conductive portions 41 is arranged) is included, and applying various kinds of workings to a blank of the bus bar module 20. In this embodiment, the bus bar module 20 is referred to as a bus bar module 20B. FIG. 5 illustrates this bus bar module 20B. In the the bus bar module 20B, the identical numerals are assigned to the similar components to these in the bus bar module 20 for convenience.

In the bus bar modules 20B, an unnecessary part (a part of the wire material forming the conductive portions 41 and a part of the cover material forming the cover 42a) is cut and removed in the blank so that the extension section 41a of each of the conductive portions 41 extends to a position where the extension section 41a is installed adjacently to the bus bar 30 to be connected. This respect is the same as that of the bus bar module 20. In this embodiment, furthermore, the conductive plate material is notched with the holding member 42 so as to divide the plate material into each of the bus bars 30 and form each of the bus bar holders 42b and each of the connection areas 40b. In other words, in this embodiment, there is provided the plurality of notch areas Sc that is obtained by notching the conductive plate material with the holding member 42 and that is continued to the adjacent bus bar holders 42b and the connection area 40b in the arranging direction of each of the bus bars 30. Thus, in this bus bar module 20B, the notch areas Sc including a notched part of the plate material are defined similarly to the example described above. In this embodiment, this bus bar module 20B can obtain the same effect as that of the example described above, and the battery pack 1 including this bus bar module 20B can also obtain the same effect as that of the example described above.

In this bus bar module 20B, after cutting and notching, by notching and the like a resin material between the electric connecting portion 41b that is an end part of the conductive portion 41 on the extending direction side and the extension section 41a of the adjacent conductive portion 41, the electric connecting portion 41b is cut and removed from the extension section 41a of the adjacent conductive portion 41. Furthermore, only a cover at the tip in the electric connecting portion 41b is stripped, and the tip is exposed. In this manner, the bus bars 30 and the flexible flat conductor 40 are formed. In each of the conductive portions 41, the electric connecting portion 41b is folded to a side of the bus bar 30 to be connected, and a stripped tip is physically and electrically connected to the bus bar 30 to be connected by welding, brazing, and the like. Each of the connection areas 40b is formed in a mountain fold shape. The bus bar module 20B is formed in this manner.

A bus bar module according to the present embodiment reduces a difference in rigidity of the connection areas by, for example, changing a size of each of the notch areas. In this manner, this bus bar module can also reduce a difference in an amount of expansion and contraction of each of the connection areas, and can reduce, at that time of changing an interval between the adjacent conductor connection areas, a difference in change of an interval at each place. Thus, because position adjustment of each of the bus bars to the electrode terminals is more facilitated than before, this bus bar module can improve assembling workability at the time of assembling the bus bar module to the battery module. A battery pack according to the present embodiment includes the bus bar module so as to obtain the same effect as that of the bus bar module.

Although the invention has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bus bar module comprising:
a plurality of bus bars that are arranged at intervals from each other in an arranging direction of electrode terminals of each of electrode terminal groups arranged in a row on a battery module formed of a plurality of battery cells, and are physically and electrically connected to the electrode terminals to be connected; and
a flexible flat conductor that includes conductive portions each electrically connected to each of the bus bars, and insulating holding members each holding each of the conductive portions and each of the bus bars, and gives flexibility to the conductive portions and the insulating holding members, the flexible flat conductor being formed in a flat shape, wherein
the conductive portions include respective extension sections that extend in the same direction from each other in the arranging direction and are disposed at intervals from each other, and respective electric connecting portions that are each an end part on an extending direction side of the extension sections and are each electrically connected to the bus bar to be connected in a direct or indirect manner, the insulating holding members each include a cover that covers each of the conductive portions so as to collectively hold the conductive portions, and a bus bar holder for each of the bus bars, the bus bar holder projecting from the cover and individually holding each of the bus bars, the flexible flat conductor includes conductor connection areas for respective bus bars, the conductor connection areas each being an area where the bus bar and the electric connecting portion are electrically connected to each other, and a connection area that connects the conductor connection areas adjacent in the arranging direction to each other, the cover includes a first portion covering each of the extension sections, and a second portion projecting from the first portion toward the bus bar in each connection area, a number of the extension sections covered by the first portion decreases toward the extending direction side, each of the connection areas is formed in a mountain fold shape so as to expand and contract in the arranging direction, and is formed so as to reduce a difference in rigidity between the connection areas, and widths of the second portions increase as a number of the extension sections covered by the connection area decreases.

2. The bus bar module according to claim 1, wherein the bus bars and the flexible flat conductor are individual elements which are configured to be individually formed and then assembled to each other.

3. The bus bar module according to claim 1, wherein notch areas are provided by notching one sheet of a conductive plate material with the insulating holding members so as to divide the conductive plate material into the bus bars and form the respective bus bar holders and the respective connection areas.

4. The bus bar module according to claim 1, wherein the electrode terminals are each a pillared electrode pole that projects from a cell main body of the corresponding battery cell, and each of the bus bars includes a through-hole in which the electrode terminal is inserted.

5. The bus bar module according to claim 2, wherein the electrode terminals are each a pillared electrode pole that projects from a cell main body of the corresponding battery cell, and each of the bus bars includes a through-hole in which the electrode terminal is inserted.

6. The bus bar module according to claim 3, wherein the electrode terminals are each a pillared electrode pole that projects from a cell main body of the corresponding battery cell, and each of the bus bars includes a through-hole in which the electrode terminal is inserted.

7. A battery pack comprising:

a battery module that is formed of a plurality of battery cells; and a bus bar module that electrically connects the battery cells to each other in series or in parallel, wherein the bus bar module includes a plurality of bus bars that are arranged at intervals from each other in an arranging direction of electrode terminals of each of electrode terminal groups arranged in a row on the battery module, and are physically and electrically connected to the corresponding electrode terminals and a flexible flat conductor that includes a conductive portion physically and electrically connected to each of the bus bars and insulating holding members each holding each of the conductive portions and each of the bus bars, and gives flexibility to the conductive portions and the insulating holding members, the flexible flat conductor being formed in a flat shape, the conductive portions include respective extension sections that extend in the same direction from each other in the arranging direction and are disposed at intervals from each other, and respective electric connecting portions that are each an end part on an extending direction side of the extension sections and are each physically and electrically connected to the bus bar, the insulating holding members each include a cover that covers each of the conductive portions so as to collectively hold the conductive portions, and a bus bar holder for each of the bus bars, the bus bar holder projecting from the cover and individually holding each of the bus bars, the flexible flat conductor includes conductor connection areas for respective bus bars, the conductor connection areas each being an area where the bus bar and the electric connecting portion are connected to each other, and a connection area that connects the conductor connection areas adjacent in the arranging direction to each other, the cover includes a first portion covering each of the extension sections, and a second portion projecting from the first portion toward the bus bar in each connection area, a number of the extension sections covered by the first portion decreases toward the extending direction side, each of the connection areas is formed in a mountain fold shape so as to expand and contract in the arranging direction, and is formed so as to reduce a difference in rigidity between the connection areas, and widths of the second portions increase as a number of the extension sections covered by the connection area decreases.

* * * * *